United States Patent [19]
Clayton et al.

[11] Patent Number: 5,735,092
[45] Date of Patent: Apr. 7, 1998

[54] COMPOSITE ROOFING MEMBERS HAVING IMPROVED DIMENSIONAL STABILITY AND RELATED METHODS

[75] Inventors: Thomas M. Clayton; John B. Letts, both of Carmel, Ind.

[73] Assignee: Bridgestone/Firestone, Inc., Akron, Ohio

[21] Appl. No.: 700,339

[22] Filed: Sep. 23, 1996

[51] Int. Cl.⁶ .................. E04C 2/26; E04B 7/00
[52] U.S. Cl. .......... 52/309.9; 52/745.13; 52/746.11; 52/794.1; 52/796.1
[58] Field of Search ................ 52/309.9, 794.1, 52/796.1, 746.11, 745.05, 745.13

[56] References Cited

U.S. PATENT DOCUMENTS

| | | |
|---|---|---|
| 3,512,819 | 5/1970 | Morgan et al. . |
| 3,842,559 | 10/1974 | Payne . |
| 4,037,006 | 7/1977 | Roberts et al. . |
| 4,052,831 | 10/1977 | Roberts et al. . |
| 4,357,384 | 11/1982 | Jasperson . |
| 4,366,204 | 12/1982 | Briggs ............................ 52/309.9 X |
| 4,388,366 | 6/1983 | Rosato et al. . |
| 4,449,336 | 5/1984 | Kelly . |
| 4,599,258 | 7/1986 | Hageman . |
| 4,944,818 | 7/1990 | Dybsky et al. . |
| 5,001,005 | 3/1991 | Blanpied . |
| 5,081,810 | 1/1992 | Emmert . |
| 5,102,728 | 4/1992 | Gay et al. . |
| 5,112,678 | 5/1992 | Gay et al. . |
| 5,192,598 | 3/1993 | Forte et al. . |
| 5,220,762 | 6/1993 | Lehnert et al. . |
| 5,345,738 | 9/1994 | Dimakis ............................ 52/309.9 |

Primary Examiner—Christopher Kent
Attorney, Agent, or Firm—Frank J. Troy, Sr.

[57] ABSTRACT

A composite recovery board (10) includes a foam core (11) selected from the group consisting of polyisocyanurate and polyurethane materials and mixtures thereof; a facer (15), applied to one major surface (13) of the foam core and formed from a sheet selected from the group consisting of reinforced polymer material and reinforced cellulosic material, wherein the polymer material and cellulosic material are reinforced with a material selected from the group consisting of glass strands, glass fibers, and mixtures thereof and, gypsum board (14), applied to the opposite major surface (12) of the foam core. A method of reroofing a roof includes applying composite recovery boards of the present invention to a roof deck; and, applying a weather protective layer over the recovery boards. A continuous method of making a composite recovery board includes feeding gypsum board (14) into a laminator assembly (21); depositing a foamable polymer liquid (36) onto the gypsum board; feeding a facer material (15) into the laminator assembly above the foamable polymer liquid; allowing the polymer liquid to rise between the gypsum board and facer material forming polymer foam of a pre-determined thickness; curing the polymer foam under heat (44) to create the composite board; and cutting the composite board to desired lengths.

15 Claims, 2 Drawing Sheets

COMPOSITE ROOFING MEMBERS HAVING IMPROVED DIMENSIONAL STABILITY AND RELATED METHODS

TECHNICAL FIELD

This invention relates to a composite board suitable for use as an insulation or recovery board within a roof system. Particularly, the present invention relates to a composite board having improved dimensional stability, especially when exposed to extreme environmental conditions including high heat, humidity and moisture.

BACKGROUND OF THE INVENTION

Roof construction in a low-pitched roof generally consists of a roof deck, an insulation barrier above the deck, a weather resistant layer applied to the insulation layer, and optionally a layer of heat resistant material. The roof deck generally includes materials such as wood, gypsum, concrete, steel, and the like. Above the roof deck, insulation boards are typically applied to provide thermal insulation and a uniform surface to which the weather protective layer is applied. The most common insulation boards are made of polyisocyanurate, and recovery boards are typically made of woodfiber or extruded polystyrene. Polyisocyanurate may be coated with a protective facer that can be either rigid or flexible and can be fire or flame-retardant. In a reroofing operation, the roof deck can refer to the existing roof, including the existing insulation and weather resistant layer.

Insulation or recovery boards, as they are referred to in reroofing, have been employed where the existing roof is leaking. These boards are generally applied to a built-up roof deck to provide a uniform surface when recovering an existing roof. The most common recovery boards are made of woodfiber or extruded polystyrene. The woodfiber is typically coated with a thin layer of asphaltic material on one side, but extruded polystyrene typically does not contain a facer.

To seal the roof from the elements, the insulation or recovery boards are typically covered with various materials including molten asphalt, modified bitumen membrane, rubberized asphalt, or an elastomeric composition such as EPDM (ethylenepropylene diene monomer). Not all sealing materials mentioned previously are compatible with each type of insulation or recovery board. For example, molten asphalt cannot be used with extruded polystyrene. Correct combinations of sealing material and insulation or recovery board are known to those skilled in the industry.

Finally, the heat resistant layer of material, which is generally applied directly to the weather resistant layer, can include gravel, river stone, foam or a layer of mastic covered by gravel and the like.

Application of the weather protective layer can be accomplished by a number of means, usually dictated by the type of material employed. For example, sheets of a protective membrane can be rolled out over the roof and bonded together by torching or the use of an adhesive.

Although inexpensive and generally in wide use, woodfiber and polystyrene-containing insulation or recovery boards are often ineffective in hot, humid and wet environments. Particularly, woodfiber boards will disintegrate in a wet, humid environment, which is common in a reroof operation. Polystyrene will expand, bow, or distort in similar environments, especially when exposed to the extreme heat experienced upon roofs in warmer climates.

The patent literature does include panels and boards used for roofing operations. Built-up roof constructions and the components thereof, for example, are well-known in the art. With regard to insulation boards, U.S. Pat. No. 5,001,005 teaches a rigid foam board comprising a thermosetting plastic foam sandwiched between two facers; the facer comprising glass fibers, non-glass filler, and non-asphaltic binder. Likewise, U.S. Pat. No. 4,388,366 teaches a laminate insulation board comprising a plastic foam core and at least one facer sheet forming both a protective layer and a venting means for fluids; the facer sheet comprising fine glass fibers bonded together with polyvinyl acetate.

U.S. Pat. No. 5,081,810 is directed toward a building panel comprising a core sandwiched between two outer skins. The core is formed from polystyrene or polyurethane and the outer skins can include plywood or other suitable material. In lieu of plywood, the use of other materials such as gypsum has been recognized in the art.

U.S. Pat. No. 3,512,819 is directed toward modular building wall panels comprising a foamed-in-place polyurethane sandwiched between inner and outer faces of construction materials, which include hardboard, gypsum, and plywood.

U.S. Pat. No. 3,842,559 is directed toward a roof deck construction fabricated from glass-fiber-reinforced gypsum. Specifically, the roof deck includes a laminate comprising (i) a glass-fiber-reinforced gypsum board, (ii) foamed polyisocyanurate, and (iii) a layer of weather resistant plastic substance.

U.S. Pat. No. 4,037,006 is directed toward composite insulating panelboards for use in building construction. The panel-board comprises (i) a rigid, gypsum board base panel, (ii) a self-adherent layer of foamed plastic, and (iii) water-vapor resistant, flame-retardant edge sheets covering the side edges of the plastic foam layer.

U.S. Pat. No. 4,052,831 is directed toward a panel building construction, which can be applied to a roofing system, comprising (i) a rigid board such as gypsum, and (ii) a layer of foamed plastic insulation.

U.S. Pat. No. 4,449,336 is directed toward a roofing structure comprising, from the bottom up, (i) steel joints, (ii) metal decking, (iii) a layer of fireproof material formed of plasterboard, (iv) a reservoir board such as gypsum, (v) an insulation layer, and (vi) a layer of rubber lamination.

U.S. Pat. No. 5,220,762 is directed toward fibrous mat-faced, water-resistant gypsum boards. Particularly, one embodiment teaches a roof deck system including: (i) a supporting means, (ii) a fibrous mat-faced, water resistant gypsum board overlying the means, and (iii) an exterior finishing material overlying said board. This embodiment can also include an insulating material, such as isocyanurate, sandwiched between the supporting means and gypsum board. The fibrous mat comprises glass fibers and synthetic resin fibers. When a roof deck is contemplated, the finishing material includes asphalt and roofing felt preceded by the application of a settable cementitious material over the fibrous mat-faced gypsum board.

Thus, a need still exists for a recovery board which can be exposed to moisture during installation and remain dimensionally stable while wet and during the eventual evaporation of the moisture. Use of a composite which contains isocyanurate and/or urethane foam between gypsum board and a facer that comprises a polymer, such as polypropylene, polymer latexes and the like, reinforced with glass strands or glass fibers and optionally a filler material, such as calcium carbonate, clay, mica and the like, makes the composite of the present invention dimensionally stable and relatively insensitive to moisture in reroofing.

SUMMARY OF INVENTION

It is therefore, an object of the present invention to provide a relatively inexpensive composite board, particularly for use in reroofing, that is dimensionally stable in hot, humid and wet conditions.

It is another object of the present invention to provide a composite board having a facing that can withstand application of the weather protective layer onto the roof.

It is another object of the present invention to provide a composite board that uses gypsum board in lieu of particulate wood fiber board.

It is still another object of the present invention to provide a composite board having sufficient integrity to patch or cover the roof.

It is another object of the present invention to provide a composite board providing a good base for subsequent application of the final layer or roof covering and, which is compatible with the latter and the respective means of application.

It is yet another object of the present invention to provide a method for reroofing utilizing composite board.

It is still another object to provide a method for manufacturing composite boards of the present invention.

It is still another object to provide a method of reroofing a roof comprising applying composite boards of the present invention to a roof deck.

At least one or more of the foregoing objects of the present invention together with the advantages thereof over the laminated and composite materials, which shall become apparent from the specification that follows, are accomplished by the invention as hereinafter described and claimed.

In general the present invention provides a composite recovery board comprising a foam core selected from the group consisting of polyisocyanurate and polyurethane materials and mixtures thereof; a facer applied to one major surface of the foam core and comprising a sheet selected from the group consisting of reinforced polymer materials and reinforced cellulosic materials, wherein the polymer materials and the cellulosic materials are reinforced with a material selected from the group consisting of glass strands, glass fibers, and mixtures thereof; and gypsum board, applied to the opposite major surface of the foam core.

The present invention also includes a method of reroofing a roof comprising applying composite recovery boards to a roof deck, the recovery boards comprising a foam core selected from the group consisting of polyisocyanurate and polyurethane materials and mixtures thereof; and a facer applied to one major surface of the foam core and comprising a sheet selected from the group consisting of reinforced polymer materials and reinforced cellulosic materials, wherein the polymer materials and the cellulosic materials are reinforced with a material selected from the group consisting of glass strands, glass fibers, and mixtures thereof; and gypsum board, applied to the opposite major surface of the foam core; and, applying a weather protective layer over the recovery boards.

Finally, the invention provides a continuous method of making a composite recovery board comprising the steps of feeding gypsum board into a laminator assembly; depositing a foamable polymer liquid onto the gypsum board; feeding a facer material into the laminator assembly above the foamable polymer liquid; allowing the polymer liquid to rise between the gypsum board and facer material forming polymer foam of a pre-determined thickness; curing the polymer foam under heat to create the composite board; and cutting the composite board to desired lengths.

PREFERRED EMBODIMENT FOR CARRYING OUT THE INVENTION

The present invention is directed toward a composite board or roofing member that is used to reroof an existing roof. The roofing member is applied to a roof deck which is substantially flat or low-pitched, and which can be newly constructed, or which is exposed by the removal of old roofing or, which is an existing built-up roof in suitable condition for recovering. Inasmuch as roof decks are known and do not constitute part of the present invention, other than as a substrate or base upon which the roofing members are laid, further detail is not necessary. Although the roofing members can be utilized as part of new roof installations, the boards are specifically designed for reroof operations.

One common problem in most if not all reroof installations is a wet and often somewhat deteriorated roof or substrate. Typically, when a leak is noticed, and certainly when it is deemed necessary to repair, use of the laminate board of the present invention provides an inexpensive and facile means of reroofing either the affected area or more commonly, the entire roof. Thus, the roofing member must have sufficient integrity to patch or cover the roof; it must be capable of sealing the leak; it must provide a good base for subsequent application of the final layer or covering, such as an EPDM roofing membrane; and, it must be compatible with the latter and the respective means of application.

In other words, a board placed over the old roof to act as a substrate for the new waterproof membrane will typically become wet. Existing boards made from wood fiber, extruded polystyrene will distort and/or deteriorate, necessitating further reroofing efforts. Existing boards manufactured from isocyanurate foams would fare better, except the existing state of the art has been to utilize facers that also deteriorate, which can lead to untimely failure of the board. Existing facers are often reinforced with organic felt materials, which provide a wicking action through the facer. While such problems can be minimized by drying the roof before repair, or by waiting for it to drys this is not often practical.

Other facer materials have employed glass and fiberglass reinforcement components bonded together with such materials as urea/formaldehyde resins; however, these "all glass" facers as they are sometimes referred, are notorious for a condition known as "strike through" during the manufacturing process. When this occurs, the foam can more readily penetrate through the facer and reach the lamination equipment, causing it to freeze up as well as creating other manufacturing problems. This weakness has been somewhat attributed to the industries' usage of polymers as bonding agents that are porous to permit venting of gases and vapors. Polyvinyl acetate, for example, is often utilized as the bonding agent to provide such porosity in facers reinforced with glass.

Figure 1:
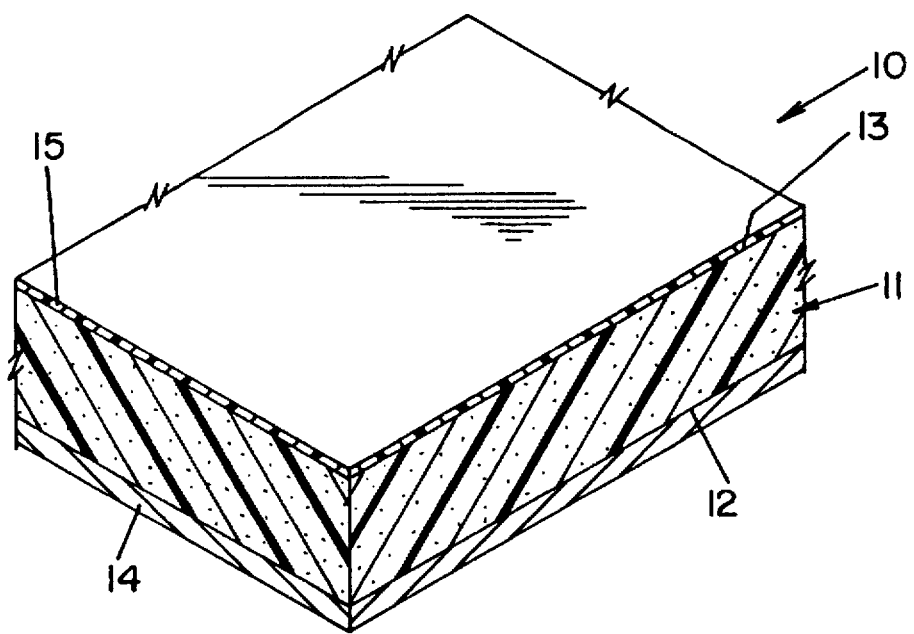
FIG. 1 is a perspective view of a composite roofing member in accordance with the present invention.

The composite board according to the present invention is best described with reference to FIG. 1. Such a board is indicated generally by the numeral 10 and comprises a foam core 11 having first and second major surfaces, lower face 12 and upper face 13, respectively. Mating with the lower face 12 of the foam core is a gypsum board 14, while a sheet of facer material 15, is bonded to the upper face 13. The composite boards 10 are generally from about 1.5 to about 4 inches thick, and can be fabricated in various dimensions depending on the intended application. Boards fabricated into sheets 4 feet wide and 8 feet long are best suited for compatibility in the building trade.

The foam core 11 can be polyisocyanurate, polyurethane, or mixtures thereof. The foam core is generally of standard production and generally includes those having an index of about 250. Particularly, when polyisocyanurate foam is employed, those having an index above 200 are preferred; and when urethane is employed, an index above 120 is preferred. Further, mixed foams can be employed, such as a mixture of polyisocyanurate and urethane. Nominal density of the polyisocyanurate foams is about 2 pounds per cubic foot (pcf) and about 2 pcf for polyurethane foams.

The upper facer 15 can comprise a reinforced polymer material or a reinforced cellulosic material. Particularly, the polymer material can include polypropylene, polymer latexes, or mixtures thereof, and the cellulosic material can include recycled paper, cardboard and the like.

Examples of polypropylene/polymer latex mixtures include latexes selected from the group consisting of styrene-butadiene rubber (SBR), polyvinyl chloride and polyvinyl alcohol. Thicknesses of the facers typically range between about 0.01 and 0.15 inches.

The polymer material also includes reinforcing materials such as glass strands, glass fibers, or mixtures thereof. Amounts of such reinforcing materials range from about 100 to about 10,000 parts by weight, based upon 100 parts by weight of the polymer selected to form the facer. More preferably, the reinforcing materials range from about 500 to about 5000 parts by weight, based upon 100 parts by weight of the polymer selected to form the facer. Furthermore, the reinforced polymer material can optionally include fillers such as clay, mica, talc, limestone (calcium carbonate), gypsum (calcium sulfate), aluminum trihydrate, antimony oxide, cellulose fibers, plastic polymer fibers, and mixtures thereof. Amounts of such fillers range from about 0 to about 5000 parts by weight, based upon 100 parts by weight of the polymer selected to form the facer.

Composites of fiberglass and cellulosic material in conjunction with carbon black and small amounts of binding additives can be formed into flat sheets, suitable for use as facer materials. Other facers comprising aluminum foil and trilaminates of aluminum foil, kraft paper and aluminum foil can also be utilized.

In lieu of a particle board or wood fiber base, the present invention substitutes a layer of gypsum board 14, which is adhered to the lower face 12 of the foam core. A suitable board for this purpose is described in U.S. Pat. No. 5,220,762, the subject matter of which is incorporated herein by reference. Such gypsum boards are manufactured by Georgia-Pacific Corporation and sold under their registered trademark, DENS-DECK. Similar gypsum boards would be equally suitable for practice of the present invention. The advantages include lower cost than wood products and, greater resistance to moisture and wet environments, thereby providing vastly better dimensional stability.

The facer of the present invention has been found to impart weatherability and durability to composite boards used as roofing substrates within a built-up roof. Particularly, the facers of the present invention have been found to provide dimensional stability to the boards, inhibiting the boards from distorting under high heat and moisture. In addition to dimensional stability, the facer protects the foam from moisture, as well as from penetration. Because of these advantages, the facers of the present invention have been found to be particularly useful with recovery boards because the environment commonly encountered in a reroof operation is hot, humid and often wet. Moreover, the optional fillers add strength to the facer and provide the facer with a rugged appearance.

The composite boards 10 are typically applied to the roof deck in staggered parallel adjacent courses that abut one another. The boards are generally fastened to the deck via nails or an adhesive, although other means of securing insulation board to roof deck are common in the art. Once the composite or recovery board of the present invention has been applied to a roof deck, the roof is completed by covering the substrate with a weather protective layer. The protective layer can include asphalt, bitumen, atactic polypropylene (APP) modified bitumen, rubberized asphalt, EPDM roofing membranes or any other conventional protective layer known in the art. In ballasted roofs, this protective layer is then covered with gravel or river stone; wherein the weight of the river stone serves a second function which is to secure the protective layer to the roof deck.

Figure 2:
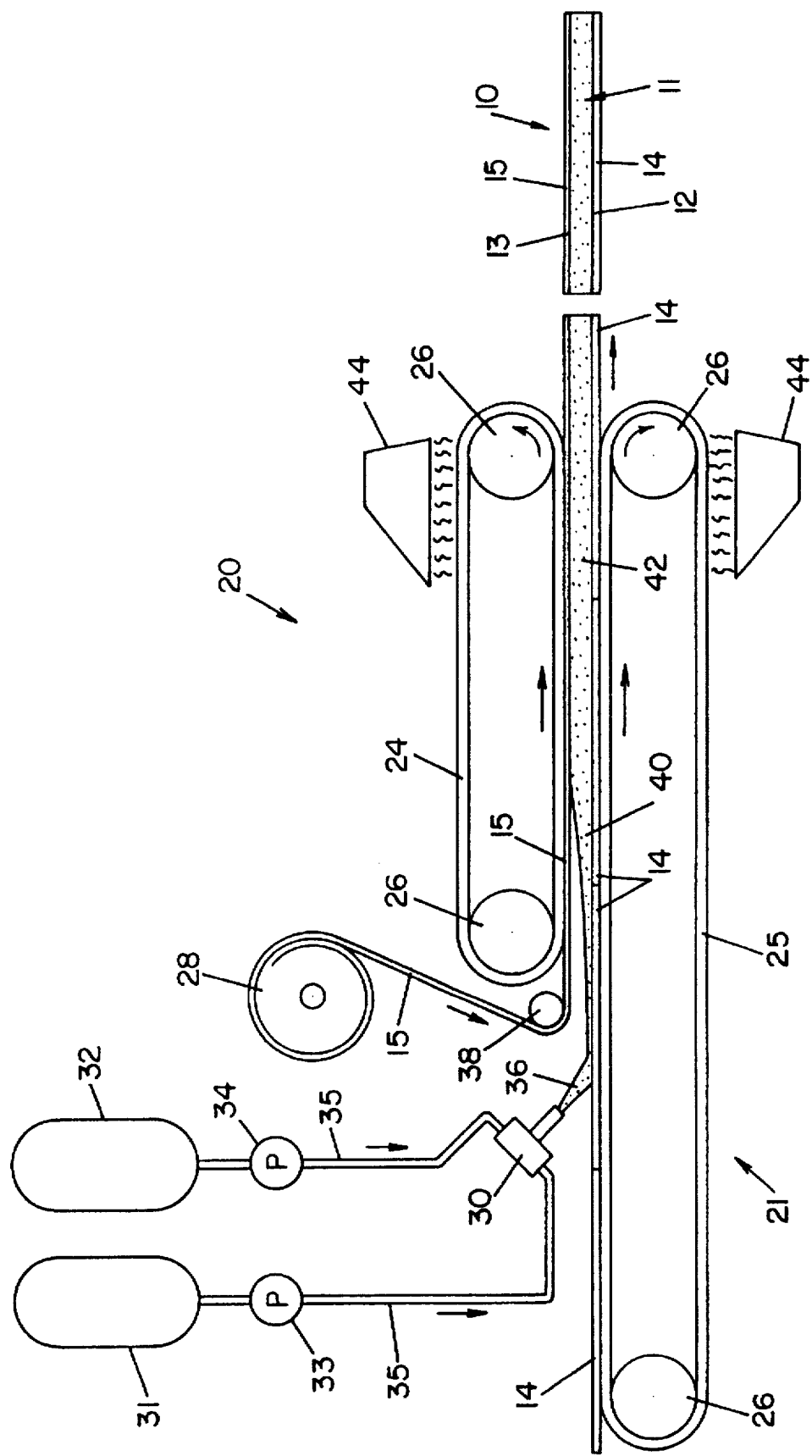
FIG. 2 is a schematic view of apparatus employed to manufacture roofing members of the present invention.

While the boards may be manufactured in a batch process, a continuous, on-line process is preferred as such a process is both efficient and economical. With reference to FIG. 2, a continuous process is schematically depicted in conjunction with apparatus 20. The apparatus provides a laminator assembly, generally 21 which employs continuous belts or treads, 24 and 25, reeved around a series of rolls 26, several of which are driven. Facer material 15 is carried by an upper spool 28 which is positioned for feeding into the laminator assembly 21. The gypsum boards 14 are first fed onto the lower belt 25, which is longer than upper belt 24 in order to receive the boards 14.

Immediately above a board 14 as it enters the drive assembly 21, is a foam mixhead 30. The mixhead 30 is fed from reservoirs 31 and 32, or whatever number are required by the polymer foam composition selected. Where the desired foam is a polyurethane, for instance, reservoir 31 can provide the isocyanate components and reservoir 32 the polyol components. The resin materials from these reservoirs are fed through metering pumps 33 and 34 and through appropriate conduits 35 into the mixhead 30, where upon contact, reaction commences to form the polymer foam.

The mixhead 30 then supplies an appropriate mixture 36 of resins from the reservoirs 31 and 32, as well as an appropriately metered amount, onto the surface of the moving board 14. Subsequently, and slightly downstream of the mixhead 30, the facer 15 is fed into the drive assembly 21, passing around a feed roller 38, which positions the facer 15 against the upper belt 24. As the board 14, facer 15 and deposited foamable composition are conveyed, the latter rises, as depicted at 40, until the facer 15 is in complete contact with the upper belt 24. It is to be appreciated that the belts 24 and 25 are adjustable to accommodate the desired thicknesses of board 10.

After the foaming has completed, the intermediate product, indicated by the numeral 42, is heated to effect curing of the polymer. This is accomplished by appropriately located heaters, generally 44, or by passage through an oven (not shown). After heating for the appropriate time (residence) and temperature, the product emerges from the laminator and is cut to length to produce the boards 10. Such cutting is within the skill of the art, including flying cut-off saws and the like, which provide desired dimensions without interruption of the apparatus 20. While lengths can be varied at will on such apparatus, the widths of the boards 10 can subsequently be trimmed to size in a separate operation, as necessary. It is also possible to provide sidewalls (not shown) in conjunction with the drive assembly 21, to define the desired widths as the polymer is foaming within the laminator.

Thus it should be evident that the device and methods of the present invention are highly effective in providing composite boards useful for reroofing. The invention is particularly suited for reroofing, but is not necessarily limited thereto. The method of the present invention for manufacturing can be practiced with other equipment and, the method for reroofing can be practiced with the variety of boards 10 that fall within the scope of the present invention.

Based upon the foregoing disclosure, it should now be apparent that the use of the composite boards described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, boards according to the present invention are not necessarily limited to those having a isocyanurate or polyurethane foam core. Moreover, as noted hereinabove, the composition of the polymer facer can be varied, particularly with the use of the optional fillers. Thus, the scope of the invention shall include all modifications and variations that may fall within the scope of the attached claims.

What is claimed is:

1. A composite recovery board comprising:

a foam core selected from the group consisting of polyisocyanurate and polyurethane materials and mixtures thereof and having opposed major surfaces;

a facer applied to one major surface of said foam core and comprising a sheet selected from the group consisting of reinforced polymer materials and reinforced cellulosic materials, wherein said polymer materials and said cellulosic materials are reinforced with a material selected from the group consisting of glass strands, glass fibers, and mixtures thereof; and gypsum board, applied to the opposite major surface of said foam core.

2. A composite board, as set forth in claim 1, wherein said sheets optionally contain a filler selected from the group consisting of clay, mica, talc, limestone, gypsum, aluminum trihydrate, antimony oxide, cellulose fibers, plastic polymer fibers, and mixtures thereof.

3. A composite board, as set forth in claim 1, wherein said foam core comprises polyisocyanurate having an index above 200.

4. A composite board, as set forth in claim 1, wherein said foam core comprises polyurethane having an index above 120.

5. A composite board, as set forth in claim 1, wherein said facer has a thickness in the range from about 0.01 to about 0.15 inches.

6. A composite board, as set forth in claim 1, wherein said facer comprises from about 100 to about 10,000 parts by weight of said reinforcing material, based upon 100 parts by weight of the polymer selected to form the facer.

7. A composite board, as set forth in claim 1, wherein said polymer materials are selected from the group consisting of polypropylene, polymer latexes, and mixtures thereof.

8. A composite board, as set forth in claim 7, wherein said sheet comprises a polypropylene/polymer latex mixture, said latex being selected from the group consisting of including styrene-butadiene rubber, polyvinyl chloride and polyvinyl alcohol.

9. A method of reroofing a roof comprising:

applying composite recovery boards to a roof deck, said recovery boards comprising a foam core selected from the group consisting of polyisocyanurate and polyurethane materials and mixtures thereof and having opposed major faces; and a facer applied to one major surface of said foam core and comprising a sheet selected from the group consisting of reinforced polymer materials and reinforced cellulosic materials, wherein said polymer materials and said cellulosic materials are reinforced with a material selected from the group consisting of glass strands, glass fibers, and mixtures thereof; and gypsum board, applied to the opposite major surface of said foam core; and applying a weather protective layer over said recovery boards.

10. A method of reroofing a roof, as set forth in claim 9, wherein said foam core comprises polyisocyanurate having an index above 200.

11. A method of reroofing a roof, as set forth in claim 9, wherein said foam core comprises polyurethane having an index above 120.

12. A method of reroofing a roof, as set forth in claim 9, wherein said facer has a thickness in the range from about 0.01 to about 0.15 inches.

13. A method of reroofing a roof, as set forth in claim 9, wherein said facer comprises from about 100 to about 10,000 parts by weight of said reinforcing material, based upon 100 parts by weight of the polymer selected to form the facer.

14. A method of reroofing, as set forth in claim 9, wherein said polymer materials are selected from the group consisting of polypropylene, polymer latexes, and mixtures thereof.

15. A method of reroofing a roof, as set forth in claim 14, wherein said sheet comprises a polypropylene/polymer latex mixture, said latex being selected from the group consisting of styrene-butadiene rubber, polyvinyl chloride and polyvinyl alcohol.

* * * * *